United States Patent
de Greef

(10) Patent No.: US 9,659,534 B2
(45) Date of Patent: May 23, 2017

(54) REDUCING VISUAL ARTIFACTS AND REDUCING POWER CONSUMPTION IN ELECTROWETTING DISPLAYS

(71) Applicant: Amazon Technologies, Inc., Seattle, WA (US)

(72) Inventor: Petrus Maria de Greef, Waalre (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/583,994

(22) Filed: Dec. 29, 2014

(65) Prior Publication Data
US 2016/0189638 A1   Jun. 30, 2016

(51) Int. Cl.
G09G 5/10 (2006.01)
G09G 3/34 (2006.01)
G02B 26/00 (2006.01)

(52) U.S. Cl.
CPC ........... *G09G 3/348* (2013.01); *G02B 26/005* (2013.01); *G09G 2300/08* (2013.01); *G09G 2310/0213* (2013.01); *G09G 2310/0251* (2013.01); *G09G 2320/0261* (2013.01); *G09G 2320/103* (2013.01); *G09G 2330/022* (2013.01); *G09G 2340/0435* (2013.01); *G09G 2360/18* (2013.01)

(58) Field of Classification Search
CPC .... G09G 3/3413; G09G 3/348; G09G 3/3696; G09G 2300/0473; G09G 2310/0213; G09G 2310/0251; G09G 2310/08; G09G 2320/0266; G09G 2320/064; G09G 2330/021; G09G 2330/023; G09G 2330/028; G02B 26/005
See application file for complete search history.

(56) References Cited

U.S. PATENT DOCUMENTS

| | | | | |
|---|---|---|---|---|
| 5,552,802 A | * | 9/1996 | Nonoshita | G09G 3/3629 345/100 |
| 9,256,064 B1 | * | 2/2016 | Sprague | G02B 26/005 |
| 2003/0164295 A1 | * | 9/2003 | Sterling | B01L 3/50273 204/450 |
| 2004/0231987 A1 | * | 11/2004 | Sterling | B01L 3/50273 204/450 |
| 2006/0291125 A1 | * | 12/2006 | Zhou | G09G 3/344 361/115 |
| 2007/0063954 A1 | * | 3/2007 | Huang | G09G 3/2092 345/98 |
| 2007/0075941 A1 | * | 4/2007 | Zhou | G02B 26/005 345/84 |

(Continued)

*Primary Examiner* — Joe H Cheng
(74) *Attorney, Agent, or Firm* — Lee & Hayes, PLLC

(57) ABSTRACT

Subject matter disclosed herein relates to addressing schemes that reduce visual artifacts and power consumption in electrowetting display devices. The electrowetting display comprises a first substrate and a second substrate opposite to the first substrate, wherein a plurality of pixel regions are defined between the first substrate and the second substrate. The electrowetting display further comprises a first fluid within the pixel regions and a second fluid on the first fluid, wherein the second fluid is immiscible with the first fluid. The electrowetting display also comprises a timing controller that includes a memory. The timing controller is configured to drive the plurality of pixel regions with one or more addressing schemes that control rates of driving the plurality of pixel regions.

18 Claims, 11 Drawing Sheets

(56) References Cited

U.S. PATENT DOCUMENTS

| | | | | |
|---|---|---|---|---|
| 2008/0303780 | A1* | 12/2008 | Sprague | G09G 3/344 345/107 |
| 2009/0195850 | A1* | 8/2009 | Takahashi | G02B 26/004 359/226.3 |
| 2011/0181952 | A1* | 7/2011 | Kim | G02B 26/004 359/485.01 |
| 2011/0187696 | A1* | 8/2011 | Slack | G09G 3/3433 345/211 |
| 2013/0182309 | A1* | 7/2013 | Kim | G02B 26/005 359/290 |
| 2014/0036341 | A1* | 2/2014 | Kwon | G02B 26/005 359/290 |
| 2014/0293396 | A1* | 10/2014 | Leguijt | G02B 26/005 359/290 |
| 2014/0300594 | A1* | 10/2014 | Aubert | G09G 3/348 345/212 |
| 2015/0277100 | A1* | 10/2015 | Novoselov | G02B 26/005 359/290 |

\* cited by examiner

REDUCING VISUAL ARTIFACTS AND REDUCING POWER CONSUMPTION IN ELECTROWETTING DISPLAYS

BACKGROUND

Many portable electronic devices include displays for displaying various types of images. Examples of such displays include electrowetting displays (EWDs), liquid crystal displays (LCDs), electrophoretic displays (EPDs), light emitting diode displays (LED displays), etc. In EWD applications, an addressing scheme is utilized to drive the pixels of the EWD. Generally, one of the points of emphasis for EWD applications is low power design since in today's applications, EWDs are intended to be used in mobile and portable media devices.

An input video-stream generally represents a sequence of pixels, grouped per line; a sequence of lines, grouped per frame; and a sequence of frames defining a moving video stream (movie). When such a video stream is to be reproduced on an active matrix EWD, a timing controller and display drivers are used to transfer the video data towards the actual pixels of the EWD. A specific addressing scheme is used by the timing controller to timely control row and column drivers of the EWD. The purpose of an addressing scheme is to set (or maintain) the state of a pixel. The addressing scheme drives an active matrix transistor array and provides analog voltages to individual sub-pixels of the EWD. These voltages modulate the luminance transmission and/or reflectivity of the sub-pixels of the EWD. The sub-pixels are grouped per row and when a row is addressed, voltages of a complete row are stored as charge on corresponding sub-pixel capacitors. As the video-data is repeatedly updated, still and moving images can be reproduced by the EWD.

Each address cycle consumes an amount of energy. Furthermore, leakage of the sub-pixel capacitors (e.g. current through active matrix switches and dielectric materials) causes a degrading transmission/reflectivity. Additionally, backflow of in electrowetting liquids of the EWD is another cause of degrading transmission/reflectivity. Reset pulses used in EWDs also cause a temporary reduction of transmission/reflectivity. The temporary reduction of transmission/reflectivity causes visual image artifacts.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

FIGS. 3A-3D are diagrams illustrating examples of refreshing rows of pixel regions and the effects on luminance, according to some embodiments.

DETAILED DESCRIPTION

Figure 1A:
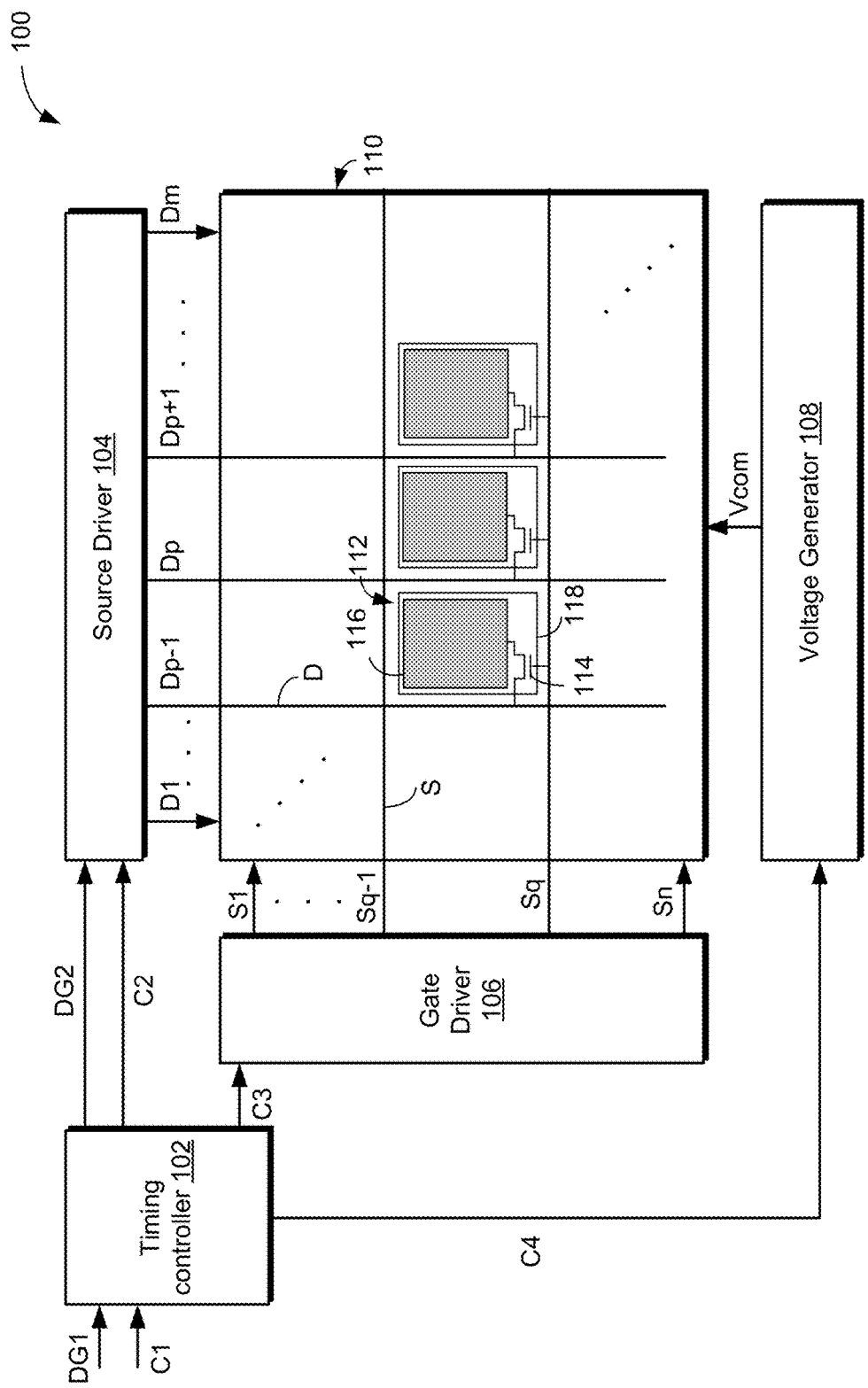
FIG. 1A is a schematic view of an example of an electrowetting display device, according to various embodiments.

The present disclosure provides addressing schemes and techniques that provide for improved data writing to pixels of electrowetting display devices and reduced power consumption and visual artifacts in the electrowetting display devices.

In general, image display apparatuses, such as, for example, various electronic devices, including, but not limited to, portable computing devices, tablet computers, laptop computers, notebook computers, mobile phones, personal digital assistants (PDAs), and portable media devices (e.g., e-book devices, DVD players, etc.), display images on a display. Examples of such displays include, but are not limited to, LCDs, EWDs and EPDs.

More particularly, a display device, such as an electrowetting display device, for example, can be a thin film transistor electrowetting display (TFT-EWD) that generally includes an array of transmissive, reflective or transflective pixels or sub-pixels (referred to herein as sub-pixels) configured to be operated by an active matrix addressing scheme. Two to ten sub-pixels generally make up a pixel. For example, rows and columns of sub-pixels are operated by controlling voltage levels on a plurality of source lines and gate lines. In this fashion, the display device can produce an image by selecting particular sub-pixels to transmit, reflect or block light. Sub-pixels are addressed (e.g., selected) via source lines and gate lines that are connected to transistors (e.g., used as switches) included in each sub-pixel. Transistors take up a relatively small fraction of the area of each sub-pixel. For example, the transistor can be located underneath the reflector in reflective displays.

Electrically, the sub-pixel is a small capacitor with a layer of insulating optical material (e.g., liquid crystal material or electrowetting material) sandwiched between two substrates, wherein each substrate generally includes a transparent conductive indium tin oxide (ITO) layer. A switching current-passing characteristic of the transistor of the sub-pixel prevents charge that is being applied to the sub-pixel from draining between refresh cycles of the display's image.

An electrowetting display employs an applied voltage to change the surface tension of a liquid in relation to a surface. For instance, by applying a voltage to a hydrophobic surface via a sub-pixel electrode in conjunction with a common electrode, the wetting properties of the surface can be modified so that the surface becomes increasingly hydrophilic. Hydrophobic generally refers to repelling water or polar fluids while hydrophilic generally refers to having an affinity for water or polar fluids. As one example of an electrowetting display, the modification of the surface tension by applying a voltage causes a fluid that includes an electrolyte, i.e. the polar fluid, in an electrowetting liquid in individual sub-pixels of the display to adhere to the modified surface and thus, replace a colored electrowetting oil layer in individual sub-pixels of the display. Thus, the electrowetting fluids in the individual sub-pixels of the display responding to the change in surface tension act as an optical switch. When the voltage is absent, the colored electrowetting oil forms a continuous film within a sub-pixel, and the color may thus be visible to a user of the display. On the other hand, when the voltage is applied to the sub-pixel, the colored electrowetting oil is displaced and the sub-pixel becomes transparent. When multiple sub-pixels of the display are independently activated, the display can present a color or grayscale image. The sub-pixels may form the basis for a transmissive, reflective, or transmissive/reflective (transreflective) display. Further, the sub-pixels may be responsive to high switching speeds (e.g., on the order of several milliseconds), while employing small sub-pixel dimensions. Accordingly, the electrowetting displays herein may be suitable for applications such as displaying video content. In addition, the low power consumption of electrowetting displays in general makes the technology suitable for displaying content on portable display devices that rely on battery power.

For driving of electrowetting displays, a dedicated gate scanning algorithm is generally implemented. In general, a first write action discharges a sub-pixel to a reset level, e.g., a black level voltage, which is also referred to as a reset of the sub-pixel. A second write action generally charges the sub-pixel to an actual required display data value.

The power consumption of an electrowetting display depends on the electrowetting display's physical properties, as well as image content. The power consumption of an electrowetting display can be modeled as an array of capacitors (corresponding to sub-pixels), which are continuously charged and discharged with new image data. The most relevant parameters are capacitive load (of the sub-pixels and the electrowetting display), drive voltage for the sub-pixels and the addressing rate for the sub-pixels. These parameters determine the rate and charge required to readdress the electrowetting display, according the formula $P=\Sigma_1^{height} \Sigma_1^{width} (f*C*V^2)$, where P represents power required for a display driver of the electrowetting display, height represents the number of rows of the sub-pixels of the electrowetting display, width represents the number of columns of sub-pixels of the electrowetting display, f represents the frequency of addressing the sub-pixels in the electrowetting display, C represents the capacitive load of the sub-pixels and the electrowetting display, and V represents the voltage output by the display driver. In certain conditions, the display driver for the electrowetting display may consume too much energy for a given application.

The perceived picture quality by a viewer of the electrowetting display is affected by brightness variations of the electrowetting display due to leakage (voltage leakage from storage capacitors of pixel regions of the electrowetting display), backflow (fluid movement within the pixel regions of the electrowetting display) and reset pulses (resetting of pixel regions within the electrowetting display). The brightness variations depend upon physical properties of the electrowetting display, as well as the input frame-rate from the image source, repeat rate for mitigating leakage and refresh rate for mitigating backflow and reset pulse intensity.

Referring to FIG. 1A, an example of an electrowetting display 100 is schematically illustrated that includes a timing controller 102, a source driver (data driver) 104, a gate driver (scan driver) 106, a voltage generator 108, and an electrowetting display panel 110. The electrowetting display panel 110 is driven by the timing controller 102, the source driver 104, the gate driver 106 and the voltage generator 108.

As an example of general operation of the electrowetting display 100, responsive to a first data signal DG1 and a first control signal C1 from an external image source, e.g., a graphic controller (not illustrated), the timing controller 102 applies a second data signal DG2 and a second control signal C2 to the source driver 104; a third control signal C3 to the gate driver 106; and a fourth control signal C4 to the voltage generator 108.

The source driver 104 converts the second data signal DG2 to voltages, i.e., data signals, and applies the data signals D1, . . . , Dp−1, Dp, Dp+1, . . . , Dm to the electrowetting display panel 110. The gate driver 106 sequentially applies scan signals S1, . . . , Sq−1, Sq, . . . , Sn to the electrowetting display panel 110 in response to the third control signal C3.

The voltage generator 108 applies a common voltage Vcom to the electrowetting display panel 110 in response to the fourth control signal C4. Although not illustrated in FIG. 1A, the voltage generator 108 generates various voltages required by the timing controller 102, the source driver 104, and the gate driver 106.

Pixel regions 112 are positioned adjacent to crossing points of the data lines D and the gate lines S and thus are arranged in a grid of rows and columns. Each pixel region 112 includes a hydrophobic surface (not illustrated in FIG. 1A), and a thin film transistor (TFT) 114 and a pixel electrode 116 under the hydrophobic surface. Each pixel region 112 may also include a storage capacitor (not illustrated) under the hydrophobic surface. A plurality of intersecting partition walls 118 separates the pixel regions 112. Pixel regions 112 can represent pixels within the electrowetting display 100 or sub-pixels within the electrowetting display 100, depending upon the application for the electrowetting display 100.

The electrowetting display panel 110 includes m data lines D, i.e., source lines, to transmit the data voltages and n gate lines S, i.e., scan lines, to transmit a gate-on signal to the TFTs 114 to control the pixel regions 112. Thus, the timing controller 102 controls the source driver 104 and the gate driver 106. The timing controller 102 applies a second data signal DG2 and a second control signal C2 to the source driver 104; a third control signal C3 to the gate driver 106; and a fourth control signal C4 to the voltage generator 108 to drive the pixel regions 112. The gate driver 106 sequentially applies scan signals S1, . . . , Sq−1, Sq, . . . , Sn to the electrowetting display panel 110 in response to the third control signal C3 to activate rows of pixel regions 112 via the gates of the TFTs 114. The source driver 104 converts the second data signal DG2 to voltages, i.e., data signals, and applies the data signals D1, . . . , Dp−1, Dp, Dp+1, . . . , Dm to sources of the TFTs 114 of the pixel regions 112 within an activated row of pixel regions 112 to thereby activate (or leave inactive) pixel regions 112 with the activated row of pixel regions 112.

Figure 1B:
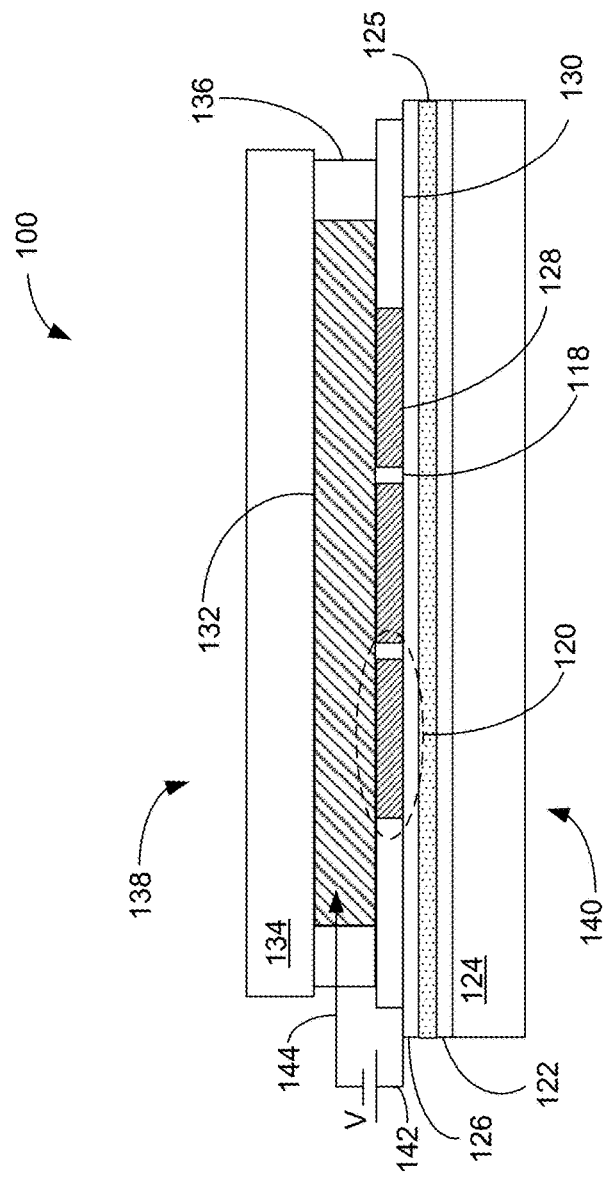
FIG. 1B is a cross-section of a portion of the electrowetting display device of FIG. 1A, according to some embodiments.

FIG. 1B is a cross-section of a portion of the electrowetting device 100 showing several electrowetting elements 120 that generally correspond to pixel regions 112, according to some embodiments. An electrode layer 122 that includes the pixel electrodes 116 (not illustrated in FIG. 1B) is formed on a bottom support plate 124. Thus, the electrode layer 122 is generally divided into portions that serve as the pixel electrodes 116 (not illustrated in FIG. 1B).

In some implementations, a dielectric barrier layer 125 may at least partially separate the electrode layer 122 from a hydrophobic layer 126 also formed on the bottom support plate 124 over the electrode layer 122. While optional, the dielectric barrier layer 125 may act as a barrier that prevents electrolyte components (e.g., an electrolyte solution) from reaching the electrode layer 122. Otherwise, for example, electrochemical reactions (e.g., electrolysis) between the electrolyte components and the electrode layer 122 may occur. The dielectric barrier layer 125 may comprise a silicon dioxide layer (e.g., about 0.2 microns thick) and a polyimide layer (e.g., about 0.1 micron thick), though claimed subject matter is not so limited.

In some implementations, the hydrophobic layer 126 can comprise a fluoropolymer, such as, for example, AF1600, produced by DuPont, based in Wilmington, Del.

The pixel walls 118 form a patterned electrowetting element grid on the hydrophobic layer 126, as can be seen in FIG. 1A. The pixel walls 118 may comprise a photoresist material, such as, for example, epoxy-based negative photoresist SU-8. The patterned electrowetting element grid comprises rows and columns that form an electrowetting element array (e.g., electrowetting display panel 110) of field electrowetting elements and border electrowetting elements. For example, an electrowetting element can have a width and length in a range of about 50 to 500 microns. A first fluid 128, which can have a thickness in a range of about 1 to 10 microns, for example, overlies the hydrophobic layer 126. The first fluid 128 is generally an oil, often referred to as an electrowetting oil, and is partitioned by the pixel walls 118 of the patterned electrowetting element grid. An outer rim 130 can comprise the same material as the pixel walls 118. A second fluid 132, such as a fluid that includes an electrolyte, overlies the oil 128 and the pixel walls 118 of the patterned electrowetting element grid.

The second fluid 132 is substantially immiscible with the first fluid 128. Generally, immiscible refers to the inability of the second fluid 132 to mix or blend with the first fluid 128. The second fluid 132 generally includes an electrolyte and is electrically conductive or polar. The second fluid 132 may be water or a salt solution such as a solution of potassium chloride in a mixture of water and ethyl alcohol, for example. The second fluid 132 is preferably transparent, but may be colored, absorbing. The first fluid 128, generally referred to as oil, is electrically non-conductive and may for instance be an alkane like hexadecane or (silicone) oil. The hydrophobic layer 126 is arranged on the bottom support plate 124 to create an electrowetting surface area. The hydrophobic character causes the first fluid 128 to adhere preferentially to the bottom support plate 124 since the first fluid 128 has a higher wettability with respect to the surface of the hydrophobic layer 126 than it has with respect to the second fluid 132. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

A top support plate 134 covers the second fluid 132 and edge seals 136 retain the second fluid 132 over the electrowetting element array. The bottom support plate 124 and the top support plate 134 may be separate parts of individual electrowetting elements or the bottom support plate 124 and the top support plate 134 may be shared by a plurality of electrowetting elements. The bottom support plate 124 and the top support plate 134 may be made of glass or polymer and may be rigid or flexible, for example.

A voltage V applied across the second fluid 132 and the dielectric barrier layer stack (e.g., the hydrophobic layer 126) of individual electrowetting elements can control transmittance or reflectance of the individual electrowetting elements. More particularly, in a number of embodiments, the electrowetting display 100 may be a transmissive, reflective or transflective display that generally includes an array of pixels or sub-pixels (e.g., pixel regions 112 of FIG. 1A) configured to be operated by an active matrix addressing scheme. For example, rows and columns of electrowetting pixels are operated by controlling voltage levels on a plurality of source lines (e.g., source lines D of FIG. 1A) and gate lines (e.g., gate lines S of FIG. 1A). In this fashion, the electrowetting display 100 may produce an image by selecting particular pixels to at least partly transmit, reflect or block light. Pixels are addressed (e.g., selected) via rows and columns of the source lines and gate lines that are electrically connected to transistors (e.g., used as switches) included in each pixel.

The electrowetting display device 100 has a viewing side 138 on which an image for display formed by the electrowetting display device 100 can be viewed, and a rear side 140. The top support plate 134 faces viewing side 138 and the bottom support plate 124 faces the rear side 140. The top support plate 134 is coupled to the bottom support plate 124 with an adhesive or sealing material 136. In an alternative embodiment, the electrowetting display device 100 may be viewed from the rear side 140. The electrowetting display device 100 may be a reflective, transmissive or transreflective type. The electrowetting display device 100 may be a segmented display type in which the image is built up of segments. The segments can be switched simultaneously or separately. Each segment includes one electrowetting element 120 or a number of electrowetting elements 120 that may be neighboring or distant from one another. The electrowetting elements 120 included in one segment are switched simultaneously, for example. The electrowetting display device 100 may also be an active matrix driven display type or a passive matrix driven display, just to name a few examples.

The electrode layer 122 is separated from the first fluid 128 and the second fluid 132 by an insulator, which may be the hydrophobic layer 126. The electrode layer 122 (and thereby the electrodes 116) is supplied with voltage signals V by a first signal line 142 as will be further described herein. A second signal line 144 is electrically connected to a top electrode (not illustrated) that is in contact with the conductive second fluid 132. This top electrode may be common to more than one electrowetting element 120 since the electrowetting elements 120 are fluidly interconnected by and share the second fluid 132 uninterrupted by the pixel walls 118. The electrowetting elements 120 are controlled by the voltage V applied between the first and second signal lines 142 and 144.

The first fluid 128 absorbs at least a part of the optical spectrum. The first fluid 128 may be transmissive for a part of the optical spectrum, forming a color filter. For this purpose, the first fluid 128 may be colored by addition of pigment particles or dye, for example. Alternatively, the first fluid 128 may be black (e.g., absorbing substantially all parts of the optical spectrum) or reflecting. The hydrophobic layer 126 may be transparent or reflective. A reflective layer may reflect the entire visible spectrum, making the layer appear white, or part of it, making it have a color.

When the voltage V applied between the signal lines 142 and 144 is set at a non-zero active signal level, the electrowetting element 120 will enter into an active state. Electrostatic forces will move the second fluid 132 toward the electrode layer 122, thereby repelling the first fluid 128 from the area of the hydrophobic layer 126 to the pixel wall 118 surrounding the area of the hydrophobic layer 126, to a droplet-like shape. This action uncovers the first fluid 128 from the surface of the hydrophobic layer 126 of the electrowetting element 120. When the voltage across the electrowetting element 120 is returned to an inactive signal level of zero volts or a value near to zero volts, the electrowetting element 120 will return to an inactive state, where the first fluid 128 flows back to cover the hydrophobic layer 126. In this way, the first fluid 128 forms an electrically controllable optical switch in each electrowetting element 120.

Generally, the thin film transistor 114 includes a gate electrode that is electrically connected to a corresponding scan line of the scan lines S, a source electrode that is electrically connected to a corresponding data line (e.g., first signal line 142 of FIG. 1B) of the data lines D, and a drain electrode that is electrically connected to the pixel electrode 116. Thus, the pixel regions 112 are operated, i.e. driving of the electrowetting display 100, based upon the scan lines S and the data lines D of FIG. 1A.

For driving of electrowetting displays via the scan lines S and the data lines D, a dedicated gate scanning algorithm may generally be implemented. The gate scanning algorithm generally defines an address timing for addressing rows of pixel regions 112. Within each input frame, each row (corresponding to the scan lines S) of electrowetting elements 120 (i.e. pixel region 112) within the electrowetting display 100 generally needs to be written to twice. On occasion, the amount of writing can be more, depending on the actual drive scheme implementation. In general, the first write action discharges an electrowetting element 120 to a reset level, e.g., a black level voltage, which is also referred to as a reset of the pixel region 112. The second write action generally charges the electrowetting element 120 to an actual required display data value. Often, pixel regions 112 may need to be refreshed to maintain their appearance when the corresponding data value for a particular pixel region 112 does not change. This is especially true when the electrowetting display 100 is displaying a still image when all of the pixel regions 112 may need to be refreshed. A refresh sequence generally involves a reset sequence followed by a repeat sequence, which recharges pixel regions 112 with their display data values.

Figure 1C:
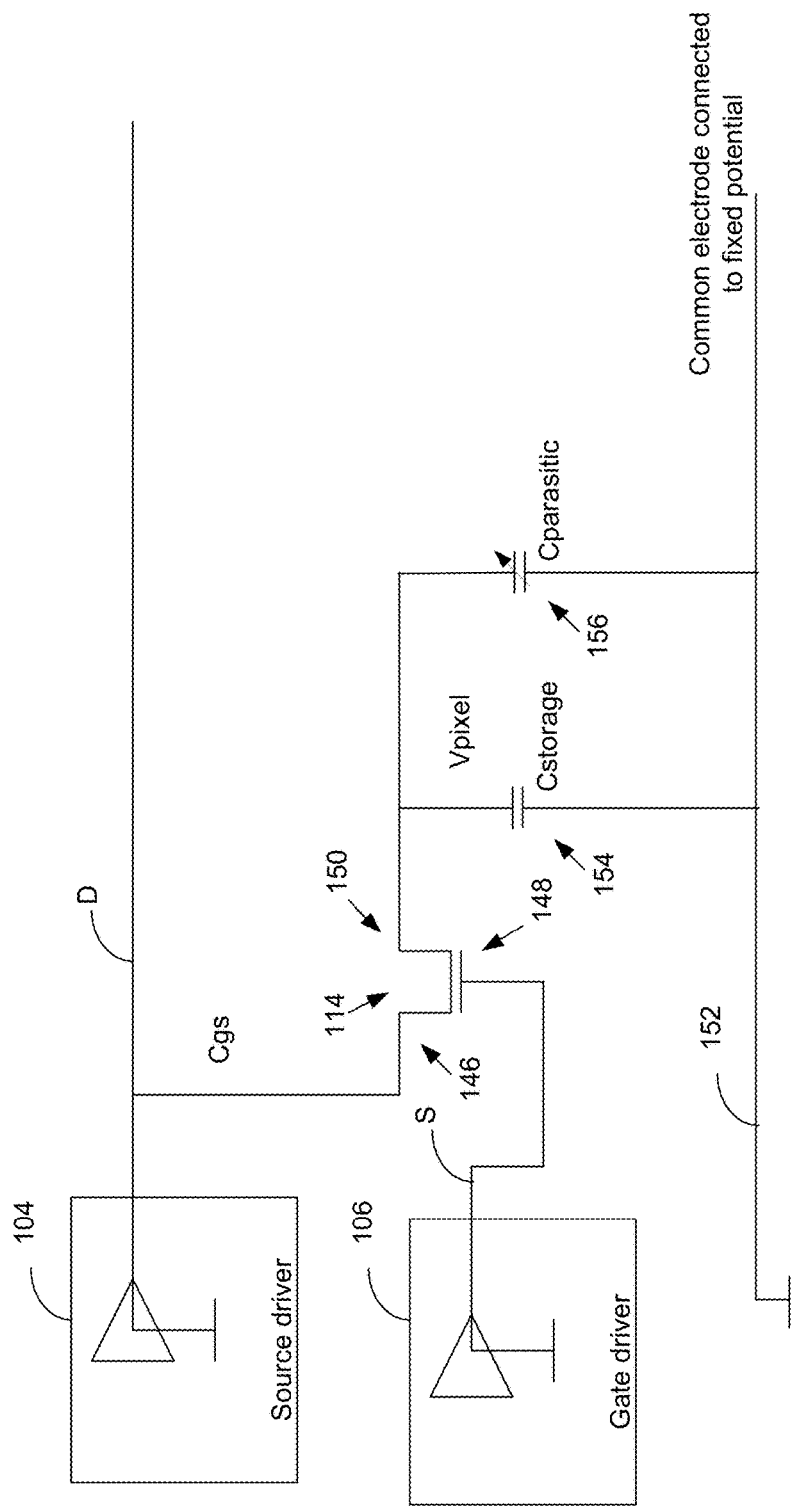
FIG. 1C is a schematic view representing circuitry for pixel regions within the electrowetting display of FIGS. 1A and 1B, according to some embodiments.

FIG. 1C schematically illustrates an arrangement of thin film transistor (TFT) 114 for a pixel region 112 within the electrowetting display 100. Each pixel region 112 within the electrowetting display 100 generally includes such an arrangement. The source driver 104 is coupled to a data line D. The data line D is coupled to a source 146 of the TFT 114 for the pixel region 112. A scan line S is coupled to a gate 148 of the TFT 114. The scan line S is coupled to a gate driver 106. A drain 150 of the TFT 114 is coupled to a common line 152 that is coupled to a fixed potential of a common electrode (not illustrated) within the electrowetting display 100. The common line 150 is also coupled to ground. A storage capacitor 154 is provided between the TFT 114 and the common line 152. A variable parasitic capacitance, C parasitic, is present in each pixel region 112 between the drain 150 of the TFT 114 and the common line 152. The variable parasitic capacitance is represented by a variable capacitor 156.

Figure 2:
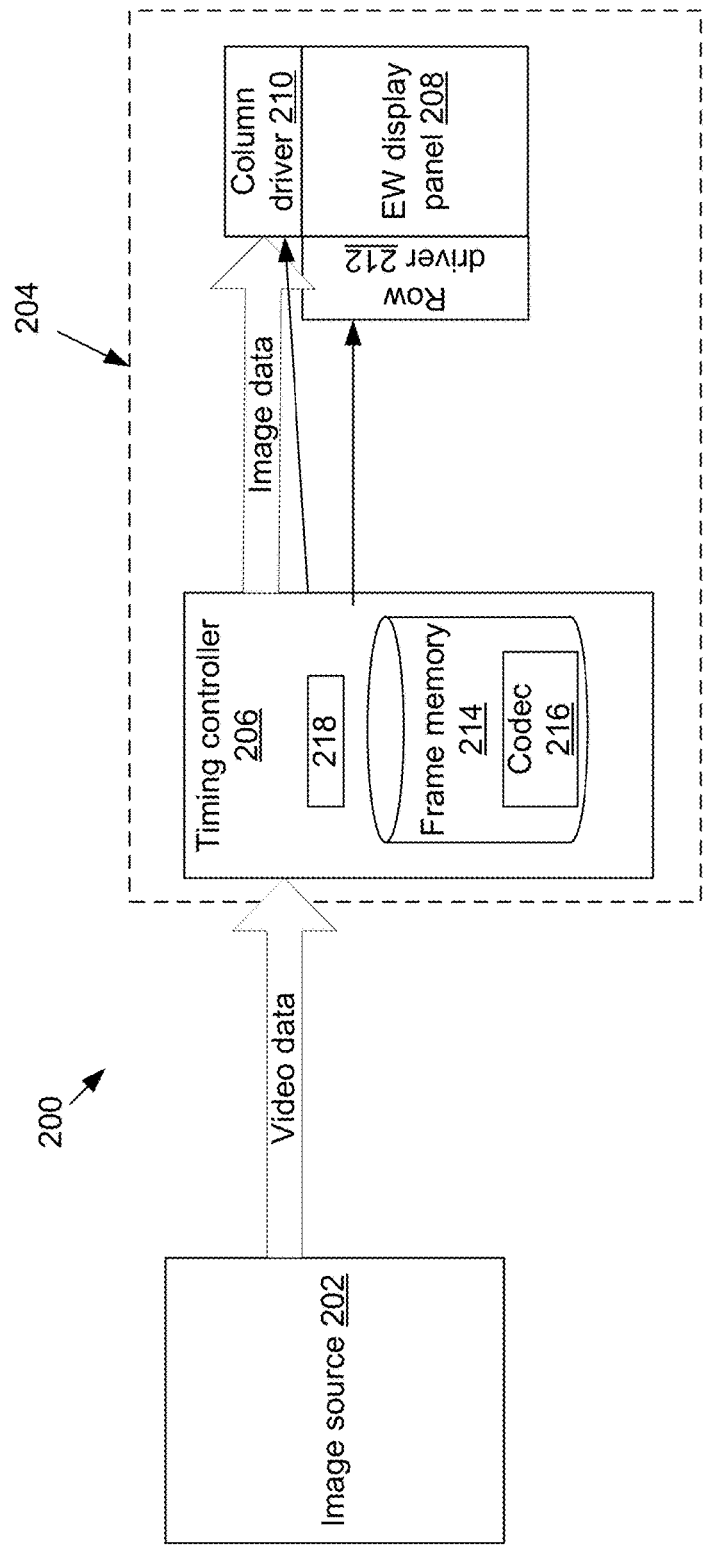
FIG. 2 schematically illustrates a simplified arrangement for a portion of an electronic device, according to some embodiments.

FIG. 2 schematically illustrates a simplified arrangement for a portion of an electronic device 200. The electronic device 200 comprises an image source 202, e.g., a graphic controller, and an electrowetting display 204 similar to the electrowetting display 100. The electrowetting display 204 comprises a timing controller 206, an electrowetting display panel 208 (similar to the electrowetting display panel 110 and thus, made up of rows and columns of pixel regions 112), column driver 210 and a row driver 212. The timing controller 206 generally corresponds to the timing controller 102 of the electrowetting display 100 and the column driver 210 generally corresponds to the source driver 104 of the electrowetting display 100, while the row driver 212 generally corresponds to the gate driver 106 of the electrowetting display 100. The timing controller 206 controls the column driver 210 and the row driver 212 using one or more addressing schemes that are included in the timing controller 206 as either software or firmware.

In accordance with various embodiments, the timing controller 206 includes a frame memory 214 that may be embedded in the timing controller 206. The frame memory 214 allows the timing controller 206 to control the address timing for the electrowetting display panel 208 independent from the address timing of the image source 202 by using the frame memory 214 such that the image source 202 requires no activity and can thus enter a power saving "sleep" mode while the electrowetting display panel 208 still displays an image. When the image source 202 sends image data for a still image (or slow moving image) to the timing controller 206, which can store the image data in the frame memory 214, the image source 202 no longer needs to send the image data to the timing controller 206 since the timing controller 206 has stored the image data in the frame memory 214. The timing controller can thus instruct the image source 202 can to go into a low power or "sleep" mode, thereby saving system power, until a new or faster moving image is to be provided to the electrowetting display 204. When needed, the timing controller 206 can repeat sending the image data from the frame memory 214 to the electrowetting display panel 208 to thereby refresh the image. Hence, the image source 202 need not be aware of any specific property of the electrowetting display 204 (e.g., an image repeat rate).

In accordance with various embodiments, the frame memory 214 includes a codec 216. As is known, a codec is a device or computer program capable of encoding or decoding a digital data stream or signal. A power and area efficient compression codec can reduce the frame memory size and bandwidth such that both power consumption and cost are reduced. Adaptive color compression technology can generally compress sRGB (standard red green blue color space) coded image data to 33% to 50% without introducing visual artifacts. Such an algorithm is generally very compact and thus, consumes little energy and is a low cost. Thus, the codec 216 can reduce the size and bandwidth needed for the frame memory 214 by using color compression technology in the codec 216 such that the overall power consumption and cost are reduced.

In accordance with various embodiments, the timing controller 206 limits the rate of addressing pixel regions in the electrowetting display panel 208 to the rate of receiving image data from the image source 202. Each new image is generally addressed in a short period of time such that fast horizontal moving images do not display visible contouring artifacts. An idle period between these image-data transfers is referred to as a vertical blanking period. When the image source 202 sends image data to the timing controller 206 at a low rate, the image update to the electrowetting display panel 208 is still performed in a relative short period of time in order to optimize the motion portrayal of the image. Effectively, a vertical blanking period is maximized providing a first timeslot for addressing reset and repeat sequences.

In accordance with various embodiments, the timing controller 206 reduces the rate of addressing pixel regions in the electrowetting display panel 208 by skipping or ignoring frames of source images of the image data from the image source 202 when almost no differences may be detected with respect to a previously displayed image such that the introduced additional motion judder is hardly visible after being filtered by an average viewer. As is known, judder is a display artifact that occurs when video content is displayed with missing frames or inconsistent frame display, i.e. one frame is displayed or refreshed 3 times while another frame is displayed or refreshed only two times. When the image source 202 sends image data that constitutes a still image or a very slow moving image to the timing controller 206 at a nominal rate, energy can be saved by repeating the image data at a lower rate that matches the characteristics of a specific electrowetting display panel 208. A still image detector 218 within the timing controller 206 can be used to detect whether new incoming images are identical or almost the same as an image that was last displayed on the electrowetting panel. Once the new image differs, due to, for example, motion or brightness variations, the image data for the new image can be sent to the electrowetting display panel 208. Accordingly, power can be saved without impacting perceived image quality.

When image source 202 sends image data towards the timing controller 206 at a fast rate, energy can be saved by skipping or ignoring video frames to reduce the image data sent to the electrowetting display panel 208 and the addressing rate from the timing controller 206 to the electrowetting display panel 208. Thus, in accordance with various embodiments, the addressing rate is reduced by skipping source images in the image data received from the image source 202 at a regular rate, e.g., by omitting every second image, such that the balance between perceived picture quality and power consumption is in favor of saving power, i.e. motion judder vs. motion blur. Reducing the rate of image data corresponding to fast moving video images may introduce visible motion judder artifacts, specifically for displays with a fast response. Yet, generally electrowetting display panels are designed for a relatively slow response. Thus, the native motion blur of an electrowetting display panel will hide introduced motion judder and the reduced image rate will not lead to a reduction of perceived image quality for a viewer. For example, for displays that operate at 60 Hz video with fast motion, some motion judder can be perceived if the rate is reduced. Yet for displays that have a visibility threshold of about 30 Hz, an addressing rate of a 60 Hz video clip can be reduced by a factor of 2 without introducing visible motion judder.

In accordance with various embodiments, an electrical charge redistribution between Cstorage 154 and Cparasitic 156 takes place after each change of the pixel voltage, due to the variable nature of Cparasitic 156. This charge redistribution may be compensated for by recharging the capacitors 154 and 156 in FIG. 1C such that nominal luminance levels can be reached and the luminance deficit becomes virtually invisible to a viewer. When the timing controller 206 addresses a refresh sequence, pixel regions 112 are reset to '0' for a period of about 1 millisecond to mitigate the backflow effect, reducing the values of Cparasitic 156. When the reset pulse period has passed, the initial image data values are restored by readdressing the pixel regions 112 with their initial data values, increasing the values of Cparasitic 156, as its capacitance varies with the position of the two liquids 128 and 132 on the pixel region 112, called White Area (WA), the parasitic capacitance depends, with some latency, on the pixel voltage. The storage capacitor 154 of the pixel region 112 is in parallel with the parasitic capacitor 156 and hence, will share its charge with the changing capacitance of the pixel region 112. Due to this charge redistribution, the voltage over the pixel regions 112 will drop after resetting and readdressing the pixel capacitors with their initial data values. The pixel capacitors and the pixel region 112 becomes less transmissive/reflective. To mitigate such a charge redistribution issue, the pixel capacitors 112 can be readdressed with their initial data values. After a few iterations, the pixel region 112 voltage will match with the voltage provided by the display drivers 210, 212. After an electrical reset pulse is applied, which reduces the luminance, the pixel regions 112 are readdressed a first time with their initial data values. The redistribution of charge limits the maximum luminance level. When addressing the pixel regions 112 for a second time with their initial data values, the voltage levels are restored. Yet after the second addressing, the distribution of charge can still be less than a maximum luminance level. When addressing the pixel regions 112 for a third time with their initial data values, the remaining effect of charge redistribution can be neglected.

A luminance reduction impulse due to the electrical reset pulse can be compensated for by adding additional luminance nearby in the spatial and/or temporal domain such that luminance reduction impulse becomes hardly visible to a viewer. When the timing controller 206 addresses a refresh sequence, pixel regions 112 are addressed to '0' for a period of about 1 millisecond to mitigate the backflow effect. During this period the liquids 128, 132 in the pixel regions 112 will react to this new value, resulting in a temporal drop of luminance. When the reset pulse period has passed, the initial data values are restored by readdressing the pixel regions 112 with their initial data values. The luminance deficit can be compensated for by increasing the luminance temporally nearby the reset period. By increasing the voltage driving level just before and just after the reset period, to a value equal to the missing luminance, the desired luminance level can generally be restored. An average viewer will temporally low-pass filter the luminance, thus making the reset pulse barely visible. After applying a reset pulse, the initial data values need to be rewritten a few times to the pixel regions 112, due to the charge redistribution as previously discussed. The addressing of the overdrive voltage is thus preferably done immediately after the addressing reset pulse. By overdriving the initial data values of the pixel regions 112 after driving them with a reset pulse, the missing luminance can be hidden temporally without the need for additional addressing cycles and hence, without spending more energy.

To mitigate the backflow effect, at regular temporal intervals a reset pulse is driving the pixel regions 112 of the electrowetting display panel 208. The reset pulse restores the pixel regions' initial luminance, yet after some time luminance will reduce due to the backflow effect.

A first method of mitigating the backflow effect involves a refresh sequence that addresses all pixel regions 112 of the electrowetting display 208 with a reset pulse, followed by a repeated addressing of image data. During the reset pulse, the image gets darker. After addressing the electrowetting display 100 with image data for a prolonged period of time, e.g. 1 second, the display's luminance will slowly reduce.

Figure 3A:
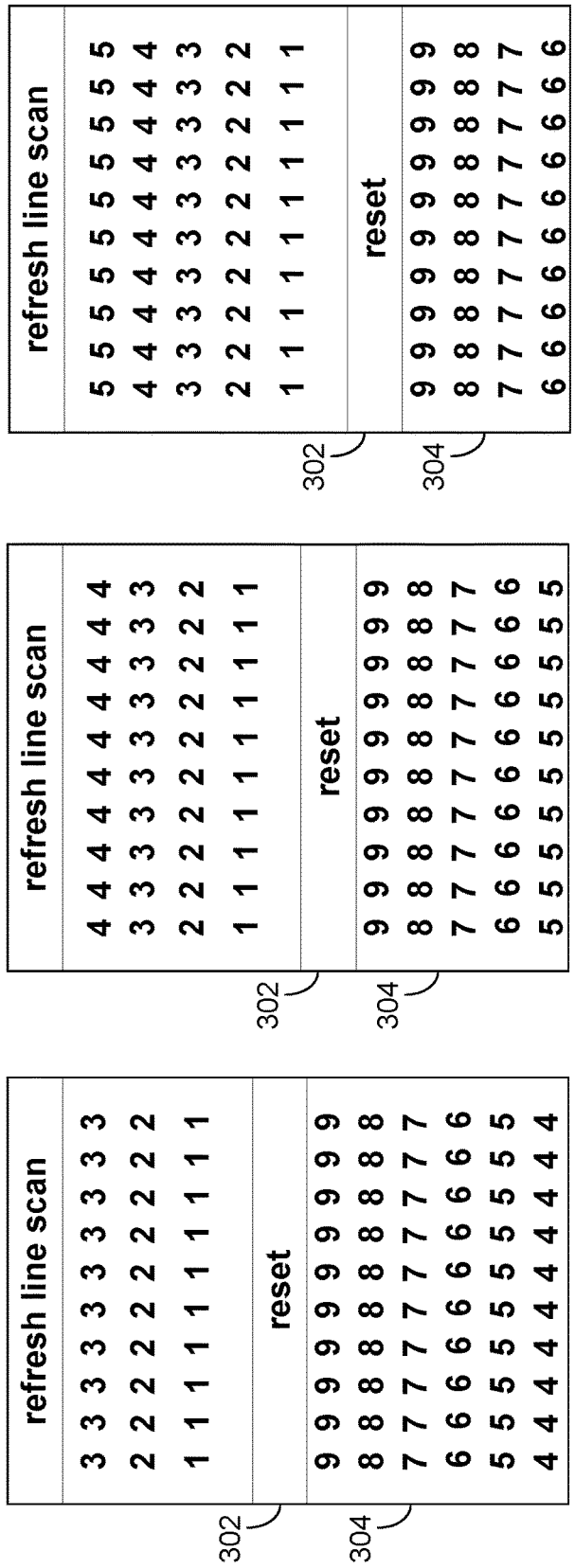

Referring to FIG. 3A, a second method progressively addresses rows of pixel regions 112 of the electrowetting display 208 from top to bottom, with a reset pulse 302 followed by a repeated addressing of image data. During the reset pulse, the addressed rows get darker (represented by black). After addressing the display with image data for a prolonged period of time, the display's luminance will slowly reduce (represented by the shade getting darker and numerals increasing in value, i.e. higher numerals represent greater loss of luminance) at 304. The brightness gradients generally have a high spatial correlation.

Figure 3B:
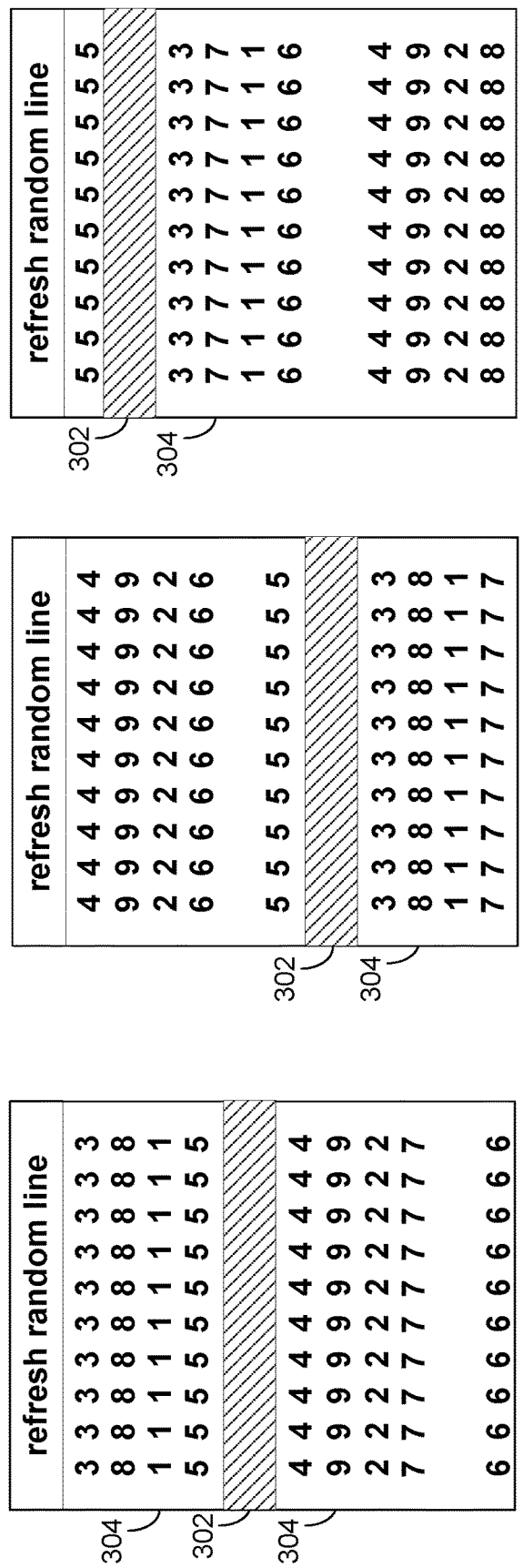

Referring to FIG. 3B, a third method pseudo-randomly addresses rows of pixel regions 112 of the electrowetting display 208. Pixel regions 112 are addressed with a reset pulse 302 followed by a repeated addressing of image data. During the reset pulse 302, the addressed rows of pixel regions 112 get darker (represented by black and numerals increasing in value, i.e. higher numerals represent greater loss of luminance). After addressing the electrowetting display 112 with image data for a prolonged period of time, the display's luminance will slowly reduce (represented by the darker shades). The brightness levels generally have a random distribution in the vertical direction.

An average viewer will spatially low-pass filter the luminance variations of an image depicted on the electrowetting display panel 208. The viewer will also temporally low-pass filter the luminance variations of the image depicted on the electrowetting display panel 208. Careful selection of the optimal spatial temporal pseudorandom order of addressing the pixel regions 112 provides a required refresh sequence for each pixel region 112 with minimal perceived artifacts.

Figure 3C:
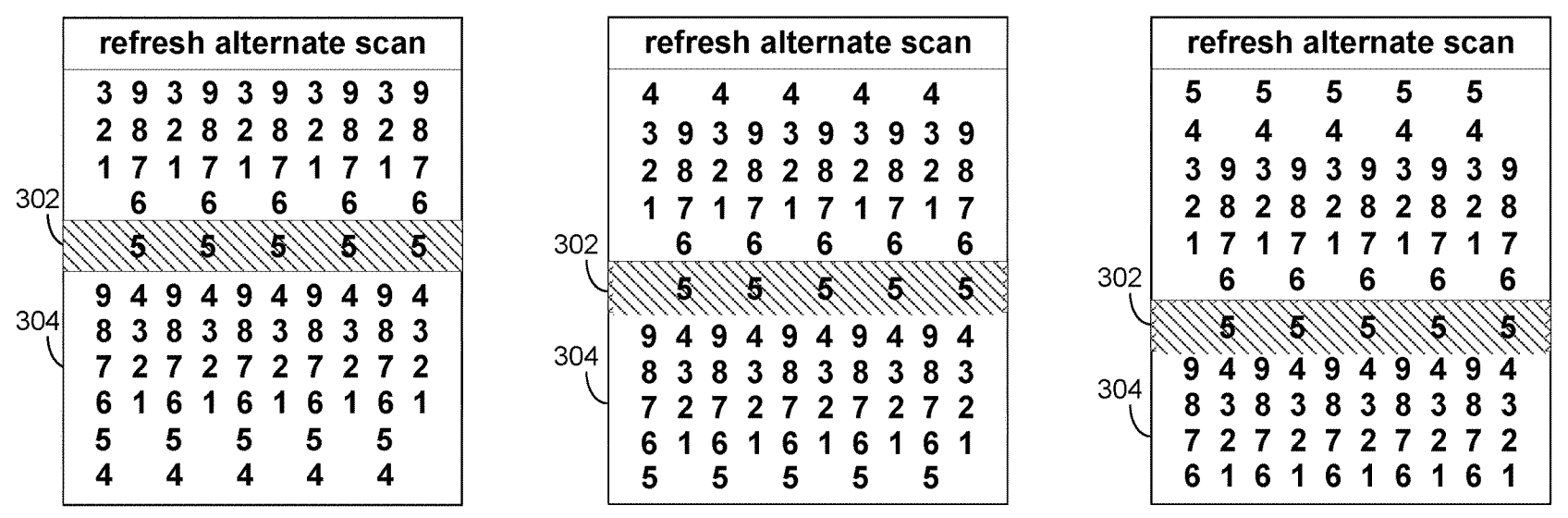

A fourth method addresses rows of pixel regions 112 of the electrowetting display panel 208 with alternating image data pulses and reset pulses. Referring to FIG. 3C, pixel regions 112 are addressed with a reset pulse 302 followed by a repeated addressing of image data. During the reset pulse 302, the addressed rows of pixel regions 112 get darker (represented by black). After addressing the electrowetting display panel 208 with image data for a prolonged period of time, the display's luminance will slowly reduce (represented by the darker shades and numerals increasing in value, i.e. higher numerals represent greater loss of luminance) at 304. The brightness levels have an alternate distribution in the horizontal direction. The brightness gradients generally have a high spatial correlation. A viewer will spatially low-pass filter the luminance variations of the image depicted on the electrowetting display. As the brightness changes are temporal, as well as spatial, a down-scrolling luminance variation pattern may become visible. For higher frequencies, this effect may be perceived as image flicker.

Figure 3D:
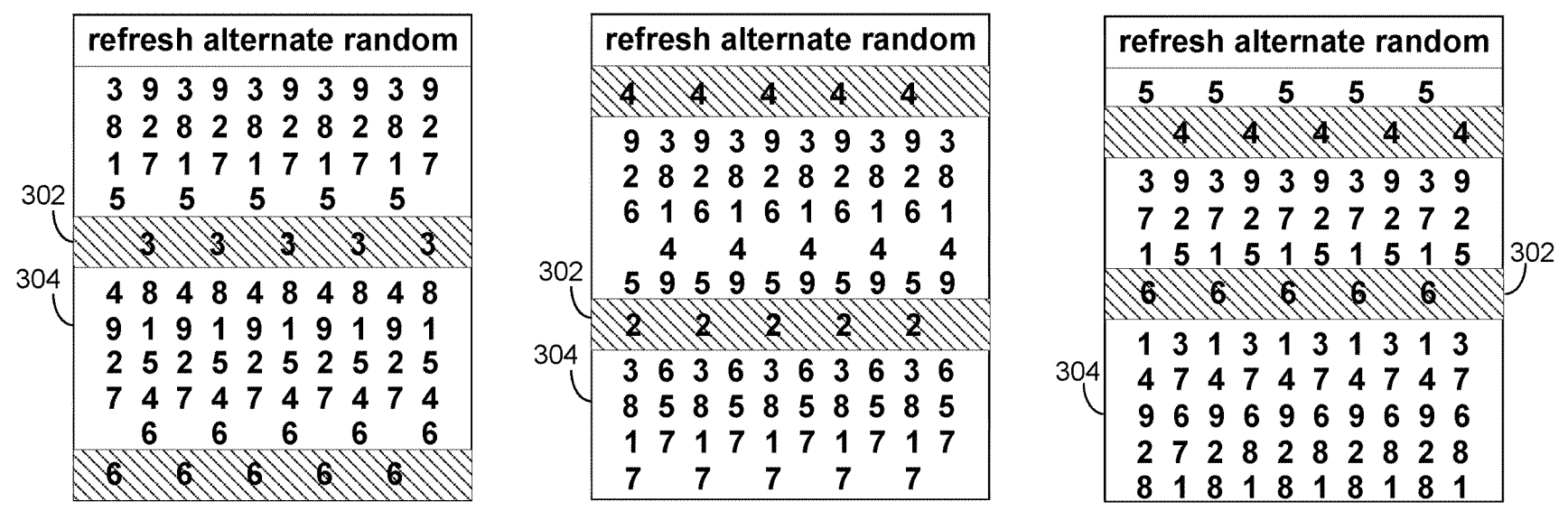

A fifth method combines the third and fourth methods. Referring to FIG. 3D, the fifth method pseudo-randomly addresses rows of pixel regions 112 of the electrowetting display panel 208 with alternating image data and reset pulses. Pixel regions 112 are addressed with a reset pulse 302 followed by a repeated addressing of image data. During the reset pulse 302, the addressed rows of pixel regions get darker (represented by black). After addressing the electrowetting display 208 with image for a prolonged period of time, the display's luminance will slowly reduce (represented by the darker shades and numerals increasing in value, i.e. higher numerals represent greater loss of luminance) at 304. The brightness levels generally have a random distribution in the vertical direction and an alternate distribution in the horizontal direction.

A viewer will spatially low-pass filter the luminance variations of the image depicted on the electrowetting display. The viewer will also temporally low-pass filter the luminance variations of the image depicted on the electrowetting display. Careful selection of the optimal spatial temporal pseudorandom order of addressing the pixel regions 112 will provide the required refresh sequence for each pixel region 112 with minimal perceived artifacts.

In accordance with various embodiments, the addressing of source image sequences, repeat sequences and refresh sequences are interlaced such that motion is not affected, i.e. jagged edges on do not appear on horizontally moving objects. Source images from the image source 202 are generally addressed at a fast rate such that there will remain a vertical blanking period. The vertical blanking period is preferably used to address a part of the refresh cycle. This results in an optimal motion portrayal and enables the least visibility of the refresh sequences. As repeat cycles only need to be addressed when the source image rate is low (generally less than 10 Hz), the repeat cycles can be addressed in unused source image addressing periods. Refresh and repeat cycles are preferably homogeneously spatially distributed and temporally distributed.

The addressing scheme of the timing controller 206 is generally provided via software or firmware to perform one of the methods of mitigating the backflow effect, described with respect to FIGS. 3A-3D. However, in embodiments, the addressing scheme of the timing controller 206 may be provided via software or firmware to perform one or more of the methods. In such embodiments, a user of the electronic device 200 (and thus a user of the electrowetting display 204) may select which method to use or the timing controller 206 may select which method to use based upon predetermined criteria such as power consumption, reduced visual artifacts, etc.

Figure 4:
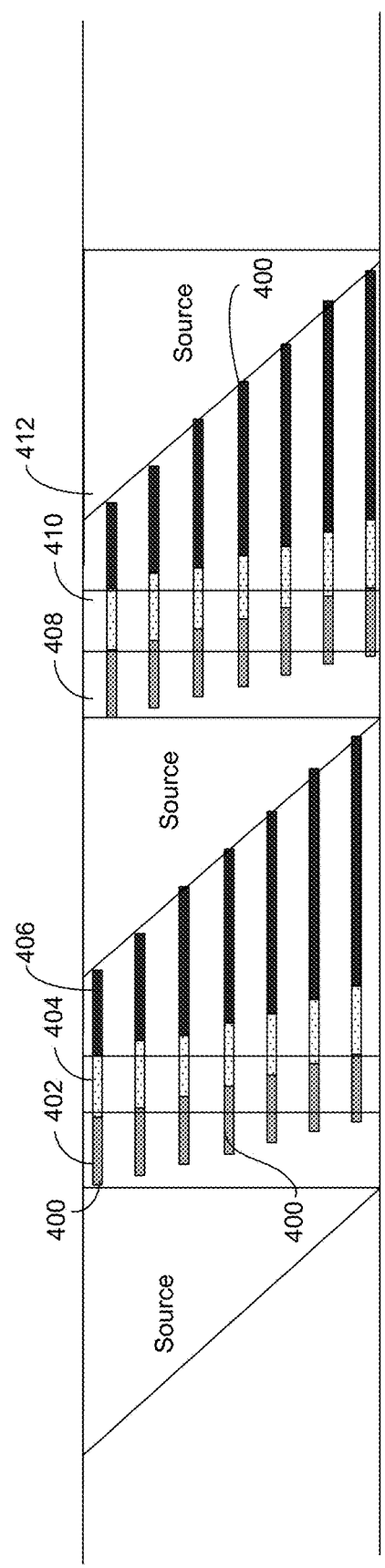
FIG. 4 is a diagram illustrating an example of interlacing the addressing of the refresh cycle, according to some embodiments.

Referring to FIG. 4, the vertical blanking period is used to address the refresh and repeat fields. As there is hardly any interaction between the addressing of the source image field and the refresh field, this method provides flexibility. The method can easily adapt to variations in the source image rate. It also provides excellent perceived picture quality by a viewer. With this method, source data is addressed at a fast rate such that there remains a long vertical blanking period. During this vertical blanking period, a refresh sequence is partly executed. The refresh sequence addresses a number of rows 400 of pixel regions 112 with a reset level at 402. The rows 400 are spatial temporal distributed (pseudo random). After the specified reset period, the rows 400 are readdressed with an overdrive voltage value at 404. In a last addressing sequence, the rows 400 are driven with a repeat of their initial data value at 406. After a number of source image updates from the image source 202 (or frame memory 214), the refresh sequence will be completed at 408, 410 and 412 and all rows 400 will have then been reset.

Figure 5:
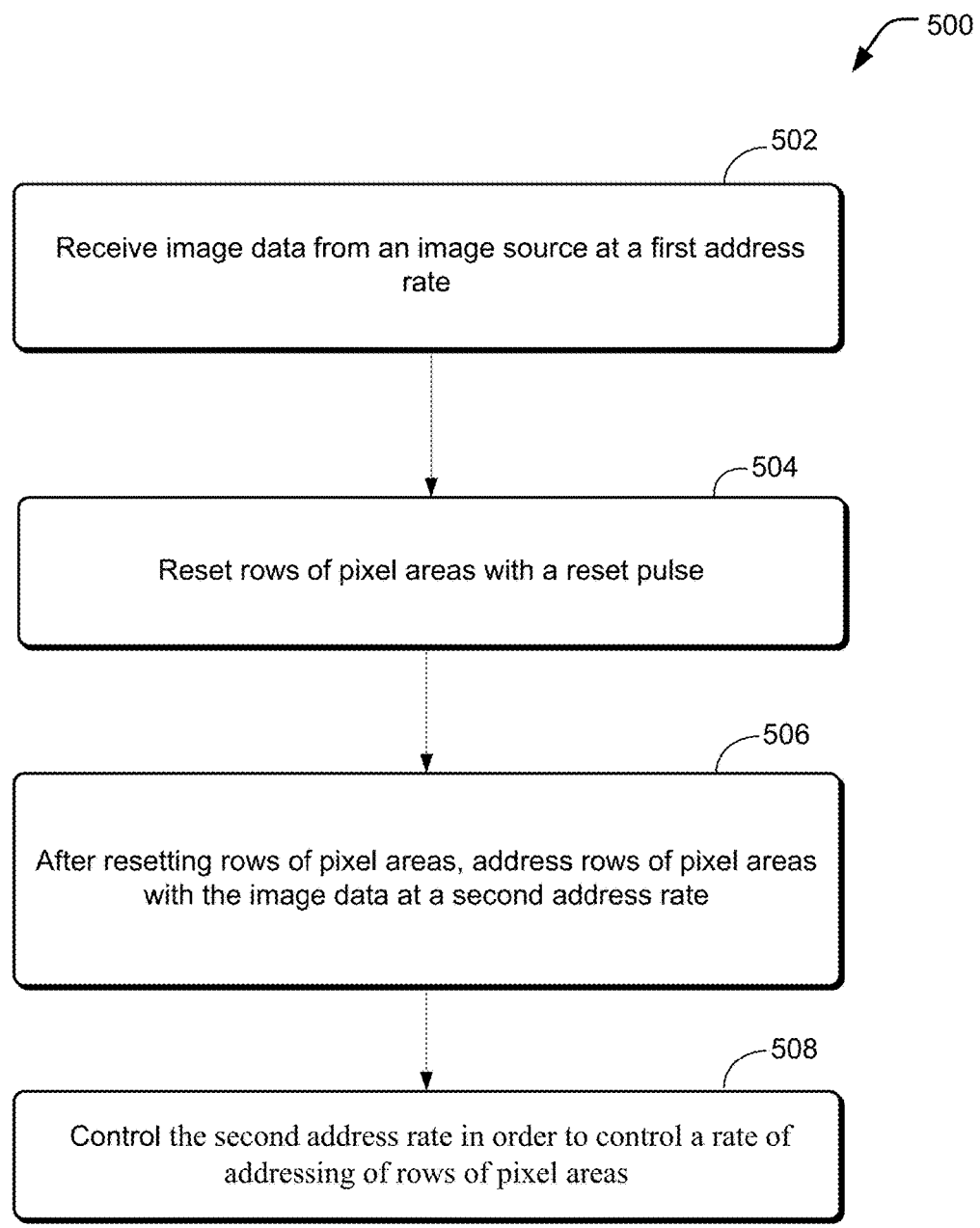
FIG. 5 is a flowchart illustrating a process of driving data signals for pixel regions of an electrowetting device, according to various embodiments.

FIG. 5 is a flowchart illustrating a process 500 of driving data signals for pixel regions of an electrowetting device, for example an electrowetting device as described in FIGS. 1A-1C, using an addressing scheme. At 502, image data is received from an image source at a first addressing rate. At 504, rows of pixel regions are reset with a reset pulse. At 506, after resetting rows of pixel regions, rows of pixel regions are addressed with the image data at a second addressing rate. At 508, the second addressing rate is controlled in order to control a rate of addressing of rows of pixel regions.

Figure 6:
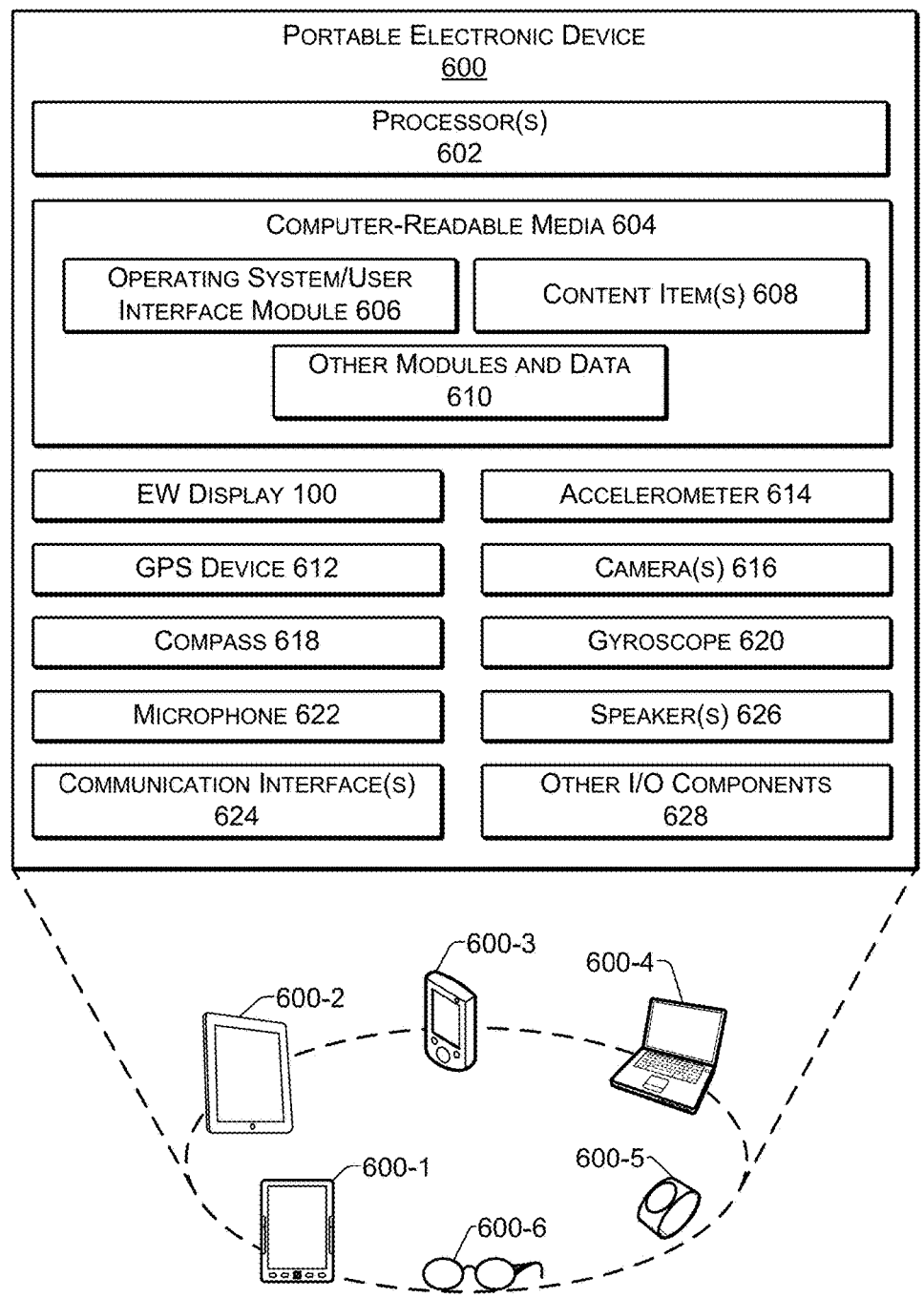
FIG. 6 illustrates select components of an example image display apparatus that may include an electrowetting display, according to various embodiments.

FIG. 6 illustrates select example components of an example image display apparatus 600 that may be used with the electrowetting display device 100 according to some implementations. Other types of displays may also be used with the example image display apparatus 600. Such types of displays include, but are not limited to, LCDs, cholesteric displays, electrophoretic displays, electrofluidic pixel displays, photonic ink displays, and the like.

The image display apparatus 600 may be implemented as any of a number of different types of electronic devices.

Some examples of the image display apparatus 600 may include digital media devices and eBook readers 600-1; tablet computing devices 600-2; smart phones, mobile devices and portable gaming systems 600-3; laptop and netbook computing devices 600-4; wearable computing devices 600-5; augmented reality devices, helmets, goggles or glasses 600-6; and any other device capable of connecting with the electrowetting display device 100 and including a processor and memory for controlling the display according to the techniques described herein.

In a very basic configuration, the image display apparatus 600 includes, or accesses, components such as at least one control logic circuit, central processing unit, or processor 602, and one or more computer-readable media 604. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some cases, the processor 602 may be one or more hardware processors and/or logic circuits of any suitable type specifically programmed or configured to execute the algorithms and processes described herein. The processor 602 can be configured to fetch and execute computer-readable instructions stored in the computer-readable media 604 or other computer-readable media. The processor 602 can perform one or more of the functions attributed to the timing controller 102, the source driver 104, and/or the gate driver 106 of the electrowetting display device 100. The processor 602 can also perform one or more functions attributed to a graphic controller (not illustrated) for the electrowetting display device.

Depending on the configuration of the image display apparatus 600, the computer-readable media 604 may be an example of tangible non-transitory computer storage media and may include volatile and nonvolatile memory and/or removable and non-removable media implemented in any type of technology for storage of information such as computer-readable instructions, data structures, program modules or other data. The computer-readable media 604 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the image display apparatus 600 may access external storage, such as RAID storage systems, storage arrays, network attached storage, storage area networks, cloud storage, or any other medium that can be used to store information and that can be accessed by the processor 602 directly or through another computing device or network. Accordingly, the computer-readable media 604 may be computer storage media able to store instructions, modules or components that may be executed by the processor 602.

The computer-readable media 604 may be used to store and maintain any number of functional components that are executable by the processor 602. In some implementations, these functional components comprise instructions or programs that are executable by the processor 602 and that, when executed, implement operational logic for performing the actions attributed above to the image display apparatus 600. Functional components of the image display apparatus 600 stored in the computer-readable media 604 may include the operating system and user interface module 606 for controlling and managing various functions of the image display apparatus 600, and for generating one or more user interfaces on the electrowetting display device 100 of the image display apparatus 600.

In addition, the computer-readable media 604 may also store data, data structures and the like, that are used by the functional components. For example, data stored by the computer-readable media 604 may include user information and, optionally, one or more content items 608. Depending on the type of the image display apparatus 600, the computer-readable media 604 may also optionally include other functional components and data, such as other modules and data 610, which may include programs, drivers and so forth, and the data used by the functional components. Further, the image display apparatus 600 may include many other logical, programmatic and physical components, of which those described are merely examples that are related to the discussion herein. Further, while the figures illustrate the functional components and data of the image display apparatus 600 as being present on the image display apparatus 600 and executed by the processor 602 on the image display apparatus 600, it is to be appreciated that these components and/or data may be distributed across different computing devices and locations in any manner.

FIG. 6 further illustrates examples of other components that may be included in the image display apparatus 600. Such examples include various types of sensors, which may include a GPS device 612, an accelerometer 614, one or more cameras 616, a compass 618, a gyroscope 620, a microphone 622, and so forth.

The image display apparatus 600 may further include one or more communication interfaces 624, which may support both wired and wireless connection to various networks, such as cellular networks, radio, Wi-Fi networks, close-range wireless connections, near-field connections, infrared signals, local area networks, wide area networks, the Internet, and so forth. The communication interfaces 624 may further allow a user to access storage on or through another device, such as a remote computing device, a network attached storage device, cloud storage, or the like.

The image display apparatus 600 may further be equipped with one or more speakers 626 and various other input/output (I/O) components 628. Such I/O components 628 may include a touchscreen and various user controls (e.g., buttons, a joystick, a keyboard, a keypad, etc.), a haptic or tactile output device, connection ports, physical condition sensors, and so forth. For example, the operating system 606 of the image display apparatus 600 may include suitable drivers configured to accept input from a keypad, keyboard, or other user controls and devices included as the I/O components 628. Additionally, the image display apparatus 600 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display comprising:
a first support plate and a second support plate opposite to the first support plate;
a plurality of pixel walls that intersect to separate a plurality of pixel regions, wherein the plurality of pixel regions is arranged in a grid of rows and columns, wherein an individual one of the pixel regions comprises:
a hydrophobic surface on the first support plate;
an oil on the hydrophobic surface between the first support plate and the second support plate;
a fluid that includes an electrolyte, wherein the fluid is disposed on the electrowetting oil; and
a pixel electrode, wherein when a voltage is applied to the pixel region via the pixel electrode in conjunction with a common electrode, a portion of the oil is displaced by the fluid on the hydrophobic surface;
a row driver to provide signals to rows of pixel regions and a column driver to provide signals to columns of pixel regions;
a timing controller, wherein the timing controller is configured to control the row driver and the column driver to drive pixel regions; and
a memory within the timing controller to store image data from a host system,
wherein the timing controller is configured to control, based upon the image data stored in the frame memory, the row driver and the column driver to drive the plurality of pixel regions, and
wherein the timing controller is further configured to drive the plurality of pixel regions using an addressing scheme
that reduces a rate of driving the plurality of pixel regions by omitting images within the image data from the host system.

2. The electrowetting display of claim 1, further comprising:
a still image detector within the timing controller to detect whether new incoming image data from the image source is identical or substantially identical to previous image data received from an image source of the host system,
wherein when image data received from the image source is identical or substantially identical to previous image data received from the image source, the timing controller informs the image source to enter a sleep mode, and wherein the timing controller refreshes pixel regions using the image data stored in the memory.

3. The electrowetting display of claim 1, wherein the individual one of the pixel regions comprises a capacitor, and wherein the timing controller controls luminance of the electrowetting display by recharging each pixel region capacitor to an original data value immediately after a reset of the pixel regions, wherein a reset sets the capacitor of the pixel region value to zero.

4. The electrowetting display of claim 1, wherein the timing controller is further configured to pseudo-randomly address individual rows of pixel regions to drive pixel regions to brightness levels having a random distribution along columns of the pixel regions.

5. An electronic device comprising an electro wetting display, the electrowetting display comprising:
a first support plate and a second support plate opposite to the first support plate, wherein a plurality of pixel regions are defined between the first support plate and the second support plate;
a first fluid within the pixel regions;
a second fluid on the first fluid, wherein the second fluid is substantially immiscible with the first fluid; and
a timing controller that includes a memory, wherein the memory stores image data received from an image source;
wherein the timing controller drives the plurality of pixel regions, based at least in part upon image data stored within the memory, with an scheme that reduces a rate of driving the plurality of pixel regions by omitting images within the image data from the image source.

6. The electronic device of claim 5, wherein the memory comprises a codec configured to compress the image data received from the image source.

7. The electronic device of claim 5, wherein the timing controller is configured to interlace addressing of source image sequences with repeat sequences or refresh sequences.

8. The electronic device of claim 5, wherein the electrowetting display further comprises a still image detector within the timing controller,
wherein when image data received from the image source is identical or substantially identical to previous image data received from the image source, the timing controller informs the image source to enter a sleep mode, and wherein the timing controller refreshes pixel regions using the image data stored in the memory.

9. The electronic device of claim 5, wherein the timing controller is further configured to pseudo-randomly address individual rows of pixel regions to drive pixel regions to have brightness levels in a random distribution along columns of the pixel regions.

10. A method of driving an electrowetting display comprising a plurality of pixel regions arranged in a grid of columns and rows, the method comprising:
receiving image data from an image source at a first addressing rate;
detecting that the image data corresponds to image data for a still image or image data for a moving image;
resetting rows of pixel regions with a reset pulse that sets a capacitor of a pixel region value to zero;
after resetting the rows of pixel regions, addressing rows of pixel regions with the image data at a second addressing rate; and
reducing the second addressing rate by omitting frames of image data within the image data from the image source.

11. The method of claim 10, wherein the second addressing rate is controlled independently of the first addressing rate.

12. The method of claim 10, further comprising storing the image data within memory of a timing controller.

13. The method of claim 12, further comprising compressing the image data stored within the memory.

14. The method of claim 10, further comprising progressively addressing rows of pixel regions after a reset pulse.

15. The method of claim 10, further comprising pseudo-randomly addressing rows of pixel regions after a reset pulse.

16. The method of claim 10, further comprising alternating reset pulses with recharging of rows of pixel regions.

17. The method of claim 10, further comprising controlling luminance of the electrowetting display by recharging a capacitor of a pixel region after resetting the capacitor of the pixel region.

18. The method of claim 10, further comprising detecting if the image data corresponds to image data for a still image.

* * * * *